(12) United States Patent
Yoshitomi et al.

(10) Patent No.: US 11,482,722 B2
(45) Date of Patent: Oct. 25, 2022

(54) FUEL CELL SYSTEM

(71) Applicant: HONDA MOTOR CO., LTD., Tokyo (JP)

(72) Inventors: Ryoichi Yoshitomi, Wako (JP); Hideharu Naito, Wako (JP); Masahiro Sato, Wako (JP); Yuki Ichinoe, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 344 days.

(21) Appl. No.: 16/701,189

(22) Filed: Dec. 3, 2019

(65) Prior Publication Data

US 2020/0185751 A1 Jun. 11, 2020

(30) Foreign Application Priority Data

Dec. 6, 2018 (JP) .............................. JP2018-228743

(51) Int. Cl.
*H01M 8/2475* (2016.01)

(52) U.S. Cl.
CPC ...... *H01M 8/2475* (2013.01); *H01M 2250/20* (2013.01)

(58) Field of Classification Search
CPC ........... H01M 8/2475; H01M 2250/20; H01M 8/2484; H01M 8/2485; H01M 8/247; Y02E 60/50; Y02T 90/40
See application file for complete search history.

(56) References Cited

U.S. PATENT DOCUMENTS

| 8,905,726 | B2 | 12/2014 | Katano et al. |
| 10,511,045 | B2 | 12/2019 | Takeyama et al. |
| 2010/0092839 | A1* | 4/2010 | Kaupert ................ H01M 8/248 429/470 |
| 2011/0274995 | A1* | 11/2011 | Tanabe .............. H01M 8/04225 429/423 |
| 2014/0363755 | A1* | 12/2014 | Naito ..................... B60L 58/33 429/470 |
| 2015/0244006 | A1* | 8/2015 | Yoshitomi ......... H01M 8/04201 429/446 |
| 2017/0263968 | A1* | 9/2017 | Naito ..................... B60L 50/71 |

FOREIGN PATENT DOCUMENTS

| JP | 2009-162069 | 7/2009 |
| JP | 2013-004352 | 1/2013 |
| JP | 2016-095920 | 5/2016 |

OTHER PUBLICATIONS

Japanese Office Action for Japanese Patent Application No. 2018-228743 dated Dec. 21, 2021.

* cited by examiner

*Primary Examiner* — Muhammad S Siddiquee
(74) *Attorney, Agent, or Firm* — Amin, Turocy & Watson, LLP

(57) ABSTRACT

A fuel cell system includes a fuel cell stack, a stack case storing the fuel cell stack, and an auxiliary device case joined to the stack case, and storing fuel cell auxiliary devices. The auxiliary device case includes an end plate part which applies a tightening load in a stacking direction to the fuel cell stack, as an integral part of the auxiliary device case.

12 Claims, 5 Drawing Sheets

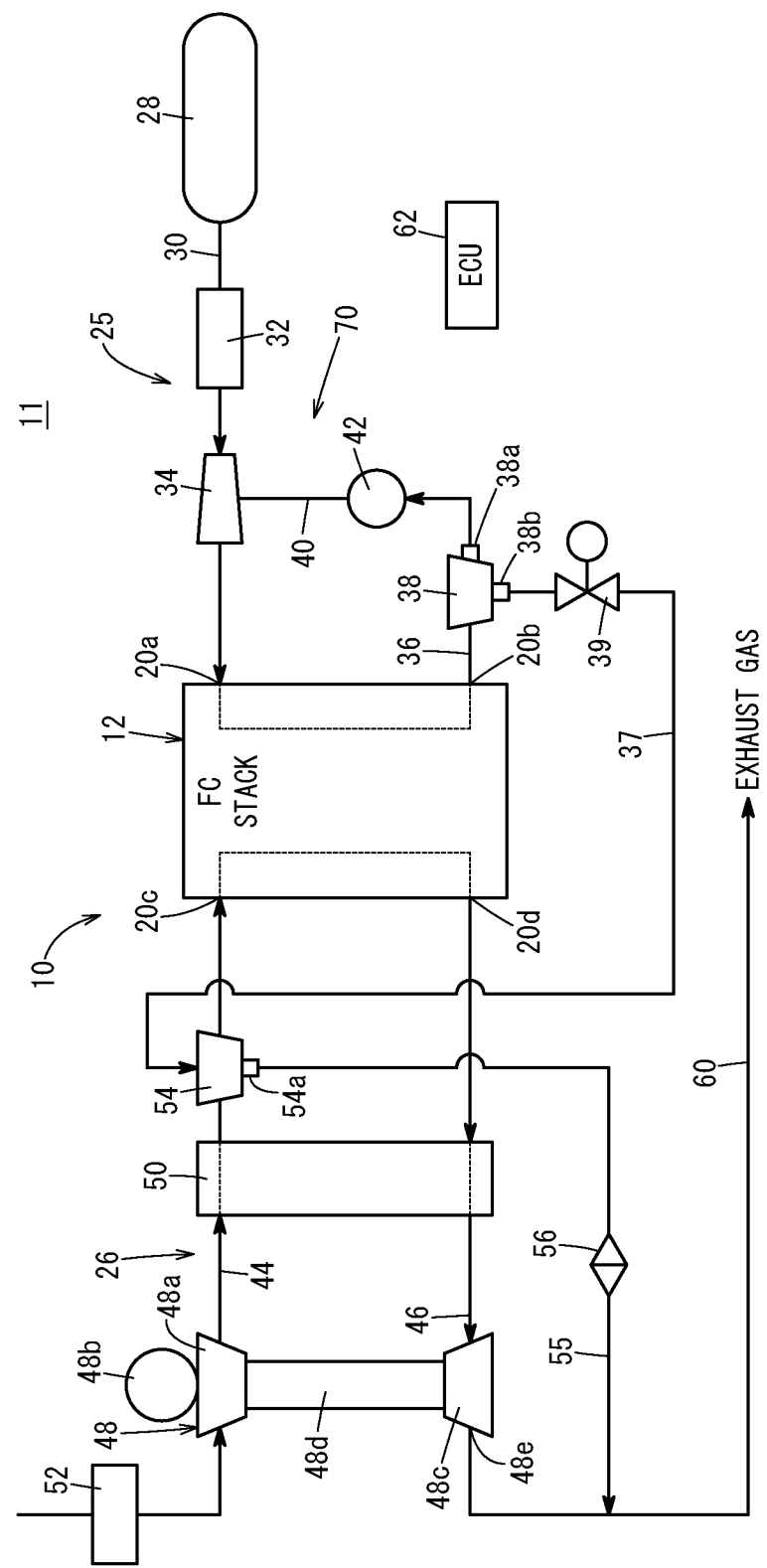

FUEL CELL SYSTEM

CROSS-REFERENCE TO RELATED APPLICATION

This application is based upon and claims the benefit of priority from Japanese Patent Application No. 2018-228743 filed on Dec. 6, 2018, the contents of which are incorporated herein by reference.

BACKGROUND OF THE INVENTION

Field of the Invention

The present invention relates to a fuel cell system including an auxiliary device case.

Description of the Related Art

For example, a solid polymer electrolyte fuel cell includes a membrane electrode assembly (MEA) formed by providing an anode on one surface of an electrolyte membrane, and a cathode on the other surface of the electrolyte membrane. The electrolyte membrane is a polymer ion exchange membrane. A power generation cell (unit cell) is formed by sandwiching the membrane electrode assembly between separators. Normally, a predetermined number of power generation cells are stacked together and mounted in a fuel cell vehicle to form e.g., an in-vehicle fuel cell stack.

A commonly used in-vehicle fuel cell stack adopts structure where a stack body formed by stacking a predetermined number of power generation cells is stored in a stack case. For example, in a fuel cell system of Japanese Laid-Open Patent Publication No. 2013-004352, an end plate is fixed to a stack case, auxiliary devices are attached to the end plate using an auxiliary device case (auxiliary device cover) formed separately from the end plate.

SUMMARY OF THE INVENTION

The fuel cell system of Japanese Laid-Open Patent Publication No. 2013-004352 has structure where the auxiliary device case is attached to the end plate. Therefore, the number of component parts becomes large, and the structure is complicated disadvantageously.

In an attempt to address the problem, an object of the present invention is to provide a fuel cell system including an auxiliary device case which has comparatively simple structure, and which can be assembled easily.

According to an aspect of the present invention, a fuel cell system is provided. The fuel cell system includes a fuel cell stack, a stack case configured to store the fuel cell stack, and an auxiliary device case joined to the stack case, and configured to store a fuel cell auxiliary device. The auxiliary device case includes an end plate part configured to apply a tightening load in a stacking direction to the fuel cell stack, as an integral part of the auxiliary device case.

In the fuel cell system of the present invention, the auxiliary device case includes the end plate part which applies the tightening load in the stacking direction to the fuel cell stack, as the integral part of the auxiliary device case. Therefore, by integration of the structure, it becomes easy to achieve reduction of a seal interface and a flange, and achieve reduction of the cost and the weight. Further, since the auxiliary device case has comparatively simple structure, the auxiliary device case can be assembled easily.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 5 is a schematic view showing a fuel cell system.

DESCRIPTION OF THE PREFERRED EMBODIMENTS

Figure 1:
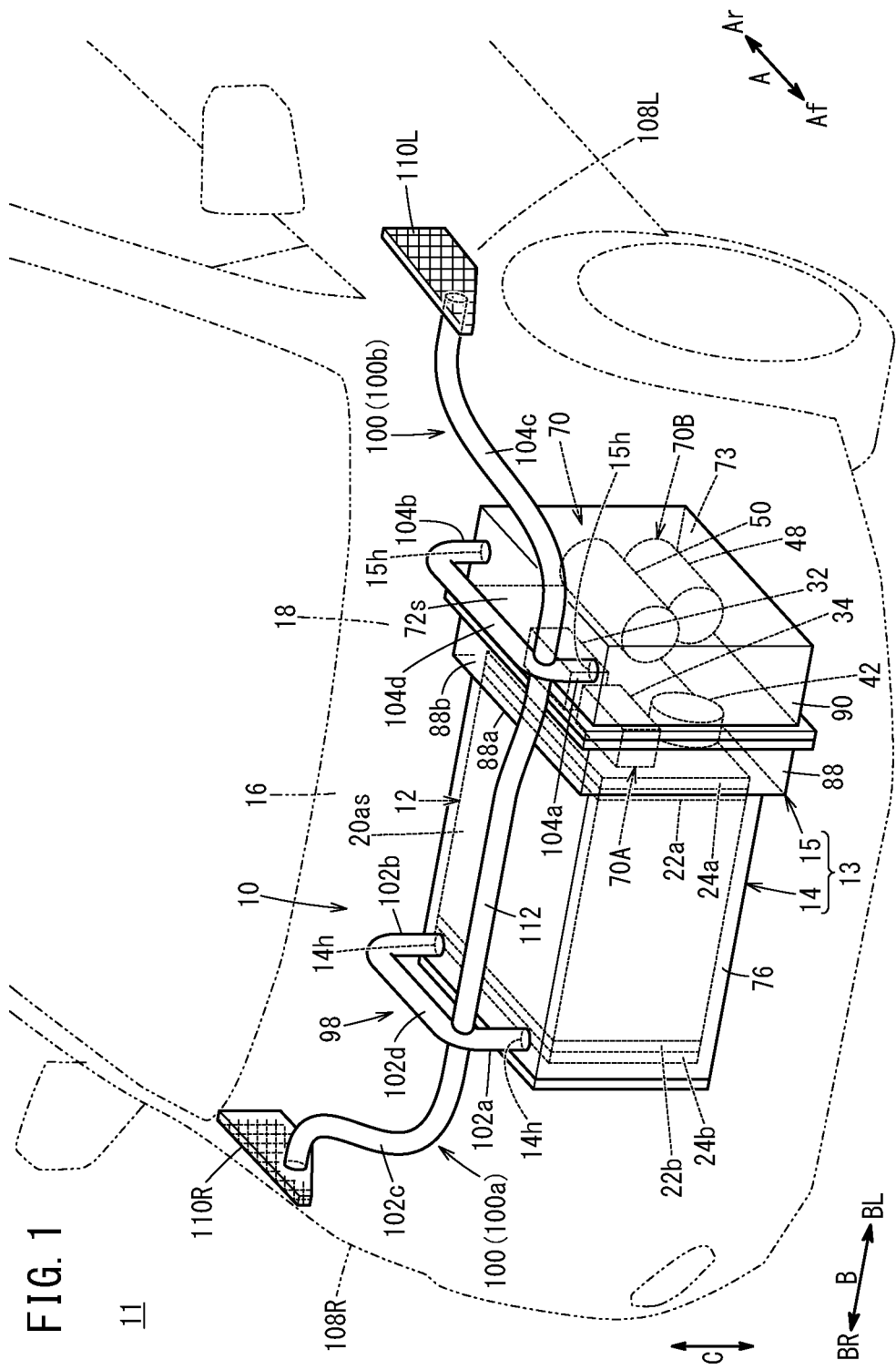
FIG. 1 is a perspective view showing a fuel cell vehicle including a fuel cell system according to an embodiment of the present invention.

As shown in FIG. 1, a fuel cell vehicle 11 including a fuel cell system 10 according to an embodiment of the present invention is, e.g., a fuel cell electric automobile. In the following description, the upper side (upper part) means the upper side (upper part) in the vertical direction. The lower side (lower part) means the lower side (lower part) in the vertical direction. In the fuel cell vehicle 11, a stack case 14 storing a fuel cell stack 12 is provided in a front room (motor room) 18 formed on the front side (in a direction indicated by an arrow Af) of a dashboard 16.

The fuel cell stack 12 includes a cell stack body 20*as* formed by stacking a plurality of power generation cells in a vehicle width direction (indicated by an arrow B). Each of the power generation cells includes an anode and a cathode, and a fuel gas flow field is formed between the anode and one of separators, and an oxygen-containing gas flow field is formed between the cathode and the other of the separators. The fuel cell stack 12 has a fuel gas supply passage for supplying a fuel gas to the fuel gas flow field, a fuel gas discharge passage for discharging the fuel gas from the fuel gas flow field, an oxygen-containing gas supply passage for supplying an oxygen-containing gas to the oxygen-containing gas flow field, an oxygen-containing gas discharge passage for discharging the oxygen-containing gas from the oxygen-containing gas flow field, a coolant supply passage for supplying a coolant, and a coolant discharge passage for discharging the coolant. The fuel gas supply passage, the fuel gas discharge passage, the oxygen-containing gas supply passage, the oxygen-containing gas discharge passage, the coolant supply passage, and the coolant discharge passage extend through the fuel cell stack 12 in the stacking direction.

At one end of the cell stack body 20*as* in the stacking direction (indicated by an arrow BL), a first terminal plate 22*a* is provided. A first insulating plate 24*a* is provided outside the first terminal plate 22*a*. At the other end of the cell stack body 20*as* in the stacking direction (indicated by an arrow BR), a second terminal plate 22*b* is provided. A second insulating plate 24*b* is provided outside the second terminal plate 22*b*. The fuel cell stack 12 is sandwiched between a right side panel 78 of a stack case 14 described later and a first case member 88 of the auxiliary device case 15 through a spacer (not shown), and a tightening load is applied to the fuel cell stack 12 in the stacking direction.

The fuel cell system 10 includes the stack case 14 storing the fuel cell stack 12, and the auxiliary device case 15 storing fuel cell auxiliary devices 70. A case unit 13 is formed by the stack case 14 and the auxiliary device case 15. The case unit 13 made up of the stack case 14 and the auxiliary device case 15 has a rectangular shape (rectangular shape having the long sides extending in the vehicle width direction) in a plan view.

Figure 2:
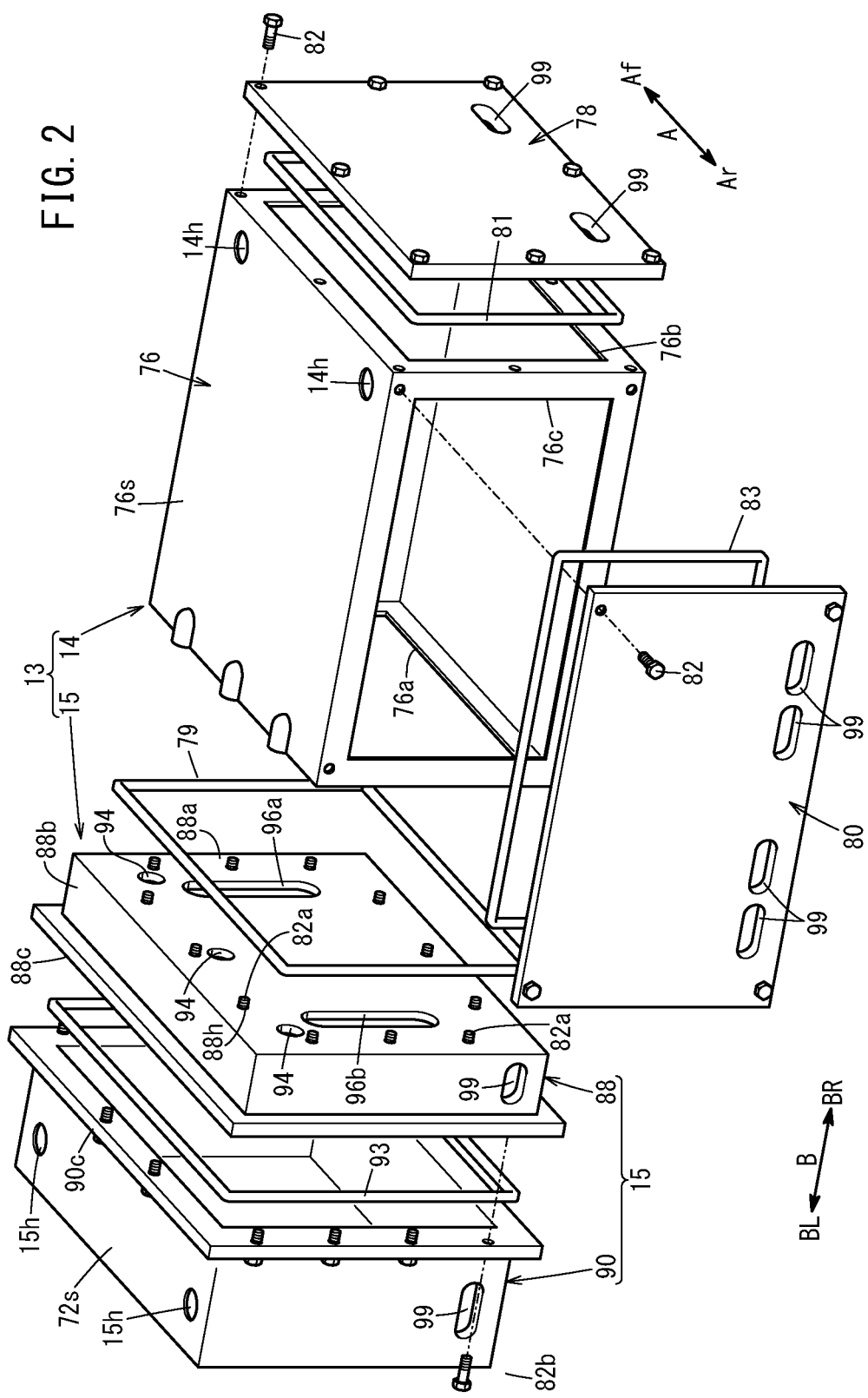
FIG. 2 is an exploded perspective view showing a case unit.

As shown in FIG. 2, the stack case 14 includes a rectangular case body 76 in a plan view. The case body 76 includes a rectangular left opening 76a formed on the left side (in a direction indicated by an arrow BL), a rectangular right opening 76b formed on the right side (in a direction indicated by an arrow BR), and a rectangular rear opening 76c formed on the rear side (in a direction indicated by an arrow Ar). The case body 76 has a box shape.

Holes 14h are formed at two corners of an upper part of the case body 76 (in the illustrated embodiment, an upper surface 76s of the case body 76 in the vertical direction) opposite to the side of the case body 76 to which the auxiliary device case 15 is connected. The holes 14h allow communication of an interior of the stack case 14 to the outside. The hole 14h may be provided only at one of the two corners of the case body 76. The hole 14h may be provided not on the upper surface 76s but on an upper part of a side surface of the stack case 14 in the vertical direction.

Further, the stack case 14 includes a right side panel 78 which closes the right opening 76b of the case body 76, and a rear side panel 80 which closes the rear opening 76c of the case body 76. The right side panel 78 is a rectangular panel, and the right side panel 78 is joined to a right end of the case body 76 using bolts 82. The right side panel 78 also serves as one of the end plates for applying a tightening load in the stacking direction to the fuel cell stack 12 (FIG. 1). A seal member 81 made of elastic material is provided between the case body 76 and the right side panel 78, over the entire periphery of joint surfaces of the case body 76 and the right side panel 78.

The rear side panel 80 is a rectangular panel. The rear side panel 80 is joined to a rear end of the case body 76 using bolts 82. A seal member 83 made of elastic material is provided over the entire joint surfaces of the case body 76 and the rear side panel 80, between the case body 76 and the rear side panel 80. The rear side panel 80 and the case body 76 may not be separate component parts. The rear side panel 80 may be integral with the case body 76.

As shown in FIG. 1, the auxiliary device case 15 is a protection case for protecting the fuel cell auxiliary devices 70. The auxiliary device case 15 is provided adjacent to the stack case 14 in the horizontal direction, and joined to the stack case 14. As the fuel cell auxiliary devices 70, a fuel gas system device 70A and an oxygen-containing gas system device 70B are stored in the auxiliary device case 15. The fuel gas system device 70A and the oxygen-containing gas system device 70B are provided adjacent to each other in the horizontal direction, in the auxiliary device case 15.

The fuel gas system device 70A stored in the auxiliary device case 15 includes an injector 32, an ejector 34, a hydrogen pump 42, and valves (not shown). The oxygen-containing gas system device 70B stored in the auxiliary device case 15 includes an air pump 48, a humidifier 50, etc. The fuel gas system device 70A is provided between the fuel cell stack 12 and the oxygen-containing gas system device 70B.

The auxiliary device case 15 includes a recessed first case member 88 provided adjacent to the stack case 14, and the recessed second case member 90 joined to the first case member 88. The fuel cell auxiliary device 70 is at least partially stored in the first case member 88.

In the embodiment of the present invention, the major fuel gas system device 70A is stored in the first case member 88, and the major oxygen-containing gas system device 70B is stored in the second case member 90. The first case member 88 and the second case member 90 are made of metal material (e.g., aluminum alloy) for having strength/rigidity enough to realize a function of protecting the fuel gas system device 70A against the external load. It should be noted that the second case member 90 storing the oxygen-containing gas system device 70B may not be made of metal material, and may be made of resin material or rubber material.

Figure 3:
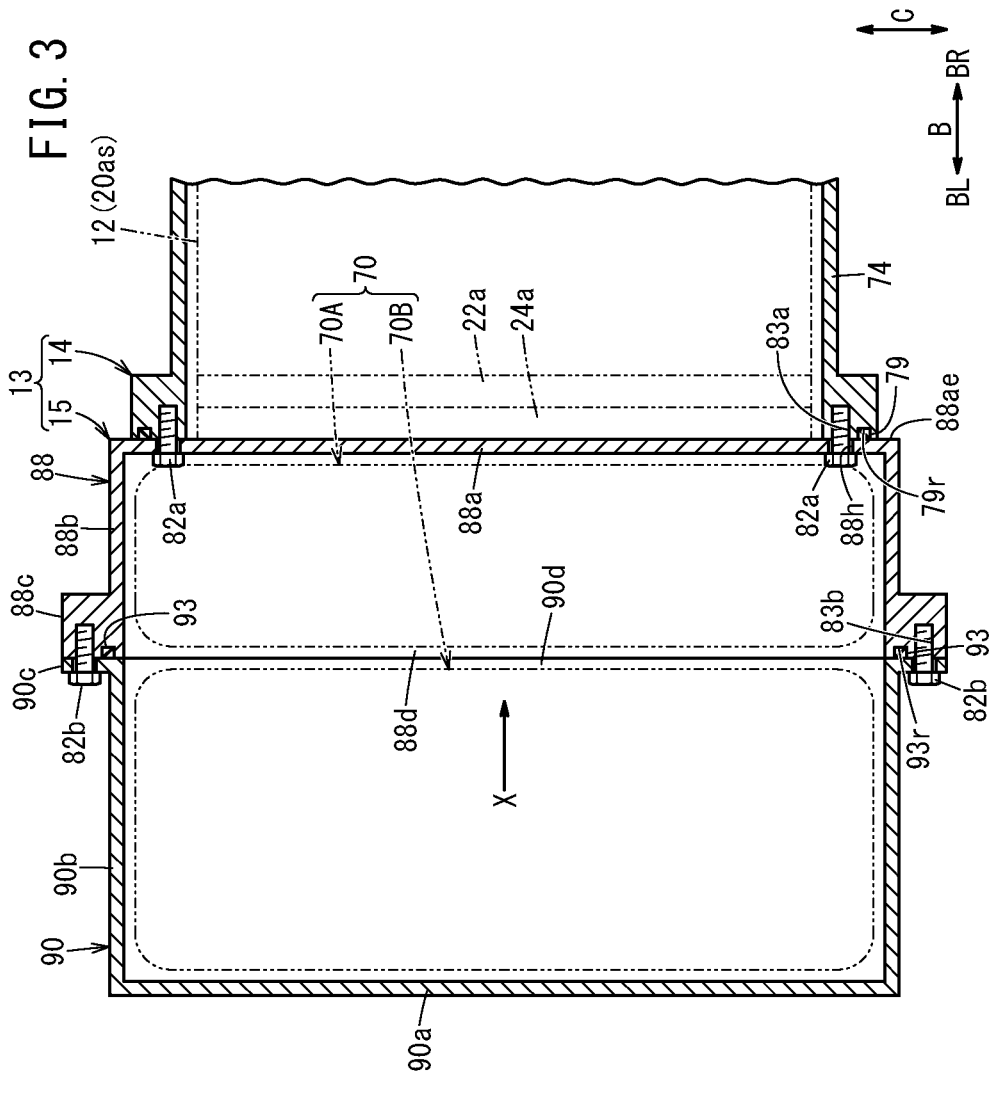
FIG. 3 is a view showing structure of an auxiliary device case.

As shown in FIGS. 2 and 3, the first case member 88 is provided between the stack case 14 and the second case member 90. The first case member 88 is joined to the left end of the case body 76 using a plurality of bolts 82a (first tightening member). The plurality of bolts 82a are inserted into a plurality of bolt insertion holes 88h provided inside the peripheral wall 88b in the first case member 88, respectively, from the inside of the first case member 88. The plurality of bolts 82a are screwed to a plurality of screw holes 83a provided at the end of the case body 76 closer to the first case member 88, respectively, inside a peripheral wall 88b. A seal member 79 made of elastic material is provided between the case body 76 and the first case member 88, over the entire periphery of joint surfaces of the case body 76 and the first case member 88. In the structure, an air-tight seal is formed between the case body 76 and the first case member 88.

The seal member 79 is provided outside the plurality of bolts 82a (and the plurality of bolt insertion holes 88h) fixing the case body 76 and the first case member 88. Therefore, the seal member 79 surrounds the plurality of bolts 82a. The seal member 79 is accommodated in a seal accommodation groove 79r provided at an end surface of the case body 76 facing the first case member 88. It should be noted that the seal accommodation groove 79r may be provided at an end surface of the first case member 88 facing the case body 76.

The first case member 88 includes an end plate part 88a which applies a tightening load in the stacking direction to the fuel cell stack 12, as an integral part of the first case member 88. The end plate part 88a is a bottom wall of the recessed first case member 88. That is, part of the first case member 88 also serves as the other end plate which applies a tightening load in the stacking direction to the fuel cell stack 12 (FIG. 1). For example, the first case member 88 is formed by casting. The end plate part 88a as a bottom wall of the first case member 88 has a flat shape. The end plate part 88a directly contacts the first insulating plate 24a.

As shown in FIG. 3, the first case member 88 includes the end plate part 88a joined to the stack case 14, and the peripheral wall (first peripheral wall) 88b extending from the entire periphery of a marginal portion 88ae of the end plate part 88a in a thickness direction of the end plate part 88a (in a direction away from the stack case 14 indicated by the arrow BL). The end plate part 88a and the peripheral wall 88b are not separate components that are joined together. The end plate part 88a and the peripheral wall 88b form the first case member 88 as a continuous one piece component. The end plate part 88a and the peripheral wall 88b may be formed integrally by welding.

The upper part of the end plate part 88a protrudes above the upper surface of the stack case 14. The lower part of the end plate part 88a protrudes below the lower surface of the stack case 14. Therefore, the outer size of the auxiliary device case 15 in the vertical direction is larger than the outer size of the stack case 14 in the vertical direction. The size of the interior of the auxiliary device case 15 in the vertical direction is larger than the size of the interior of the stack case 14 in the vertical direction. The end plate part 88a of the first case member 88 divides internal space of the stack case 14 and internal space of the auxiliary device case 15. A first flange 88c is provided at a protruding end of the peripheral wall 88b (end of the peripheral wall 80b closer to the second case member 90). The first flange 88c protrudes outward. The first flange 88c surrounds an opening 88d of the first case member 88.

As shown in FIG. 2, a plurality of ventilating passages 94 are formed in the upper part of the end plate part 88a. The ventilating passages 94 connect the inner space of the stack case 14 and the inner space of the auxiliary device case 15 to each other. The ventilating passages 94 are through holes passing through the end plate part 88a in the thickness direction (indicated by an arrow B), and provided adjacent to a left opening 76a of the case body 76. The seal member 79 is provided outside the ventilating passages 94.

The plurality of ventilating passages 94 are provided at intervals in a horizontal direction (indicated by an arrow A) which is perpendicular to a direction of joining the stack case 14 and the auxiliary device case 15 (indicated by an arrow B). The ventilating passages 94 are provided at least on both sides of the upper part of the auxiliary device case 15 (both sides in the horizontal direction perpendicular to the direction in which the stack case 14 and the auxiliary device case 15 are joined together).

The end plate part 88a of the first case member 88 has piping openings 96a, 96b for inserting connection pipes (not shown) into the piping openings 96a, 96b, and these connection pipes are connected to an oxygen-containing gas supply passage, an oxygen-containing gas discharge passage, a fuel gas supply passage, a fuel gas discharge passage, a coolant supply passage and a coolant discharge passage provided in the fuel cell stack 12, respectively.

As shown in FIG. 3, the second case member 90 is a cover member which closes the first case member 88, and the second case member 90 is joined to the first case member 88 using bolts 82. The outer size of the second case member 90 in the stacking direction (indicated by the arrow B) is larger than the outer size of the first case member 88 in the stacking direction. The second case member 90 has a recess shape recessed in a direction away from the fuel cell stack 12 (indicated by an arrow BL). Specifically, the second case member 90 includes a case wall 90a which faces the end plate part 88a of the first case member 88 and forms a recessed bottom, and a peripheral wall (second peripheral wall) 90b extending from the case wall 90a toward the first case member 88 (toward the stack case 14).

A second flange 90c is provided at a protruding end of the peripheral wall 90b (end of the peripheral wall 90b closer to the first case member 88). The second flange 90c protrudes outward. The second flange 90c surrounds an opening 90d of the second case member 90. The second case member 90 is joined to the first case member 88 using a plurality of bolts 82b (second tightening members). The plurality of bolts 82b are screwed to a plurality of screw holes 83b provided at an end of the first case member 88 closer to the second case member 90. A seal member 93 made of elastic material is provided between the first flange 88c of the first case member 88 and the second flange 90c of the second case member 90, over the entire periphery of joint surfaces of the first case member 88 and the second case member 90. In the structure, an air-tight seal is formed between the first flange 88c and the second flange 90c.

The seal member 93 is provided at the inner side of the plurality of bolts 82b for fixing the first case member 88 and the second case member 90. In the structure, the seal member 93 is surrounded by the plurality of bolts 82b. The seal member 93 is accommodated in a seal accommodation groove 93r provided at the end surface of the first case member 88 facing the second case member 90. It should be noted that the seal accommodation groove 93r may be provided at the end surface of the second case member 90 facing the first case member 88.

A plurality of bolts 82b for fixing the first case member 88 and the second case member 90 are provided at the outer side of the plurality of bolts 82a for fixing the case body 76 and the first case member 88.

Figure 4:
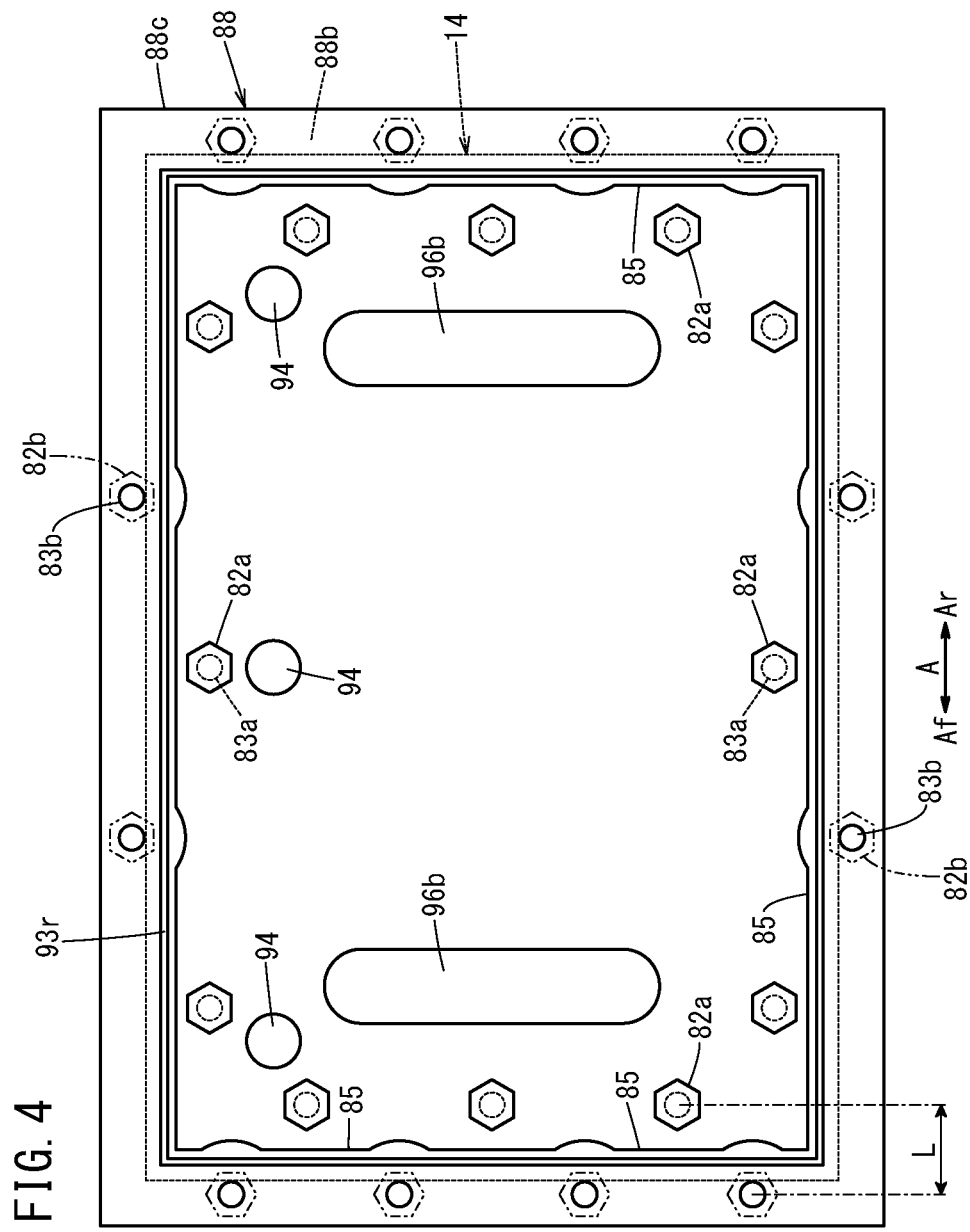
FIG. 4 is a view showing a first case member viewed in a direction indicated by an arrow X shown in FIG. 3.

In the case where the first case member 88 is viewed from the second case member 90 toward the case body 76 (in the direction indicated by the arrow X in FIG. 3), as shown in FIG. 4, the plurality of bolts 82b (and the plurality of screw holes 83b) for fixing the first case member 88 and the second case member 90 are provided alternately with respect to the plurality of bolts 82a (and the plurality of screw holes 83a) for fixing the case body 76 and the first case member 88. Therefore, the plurality of bolts 82a and the plurality of bolts 82b are arranged in a zigzag pattern along the outer peripheral portion (peripheral wall 88b) of the first case member 88.

A recess 85 (cutout) recessed toward the outer peripheral surface of the first case member 88 is provided between the adjacent screw holes 83b, in the peripheral wall 88b of the first case member 88 and the inner surface of the first flange 88c. Therefore, the plurality of recesses 85 are provided at intervals in the inner surface of the first case member 88, along the inner peripheral portion of the first case member 88. The plurality of bolts 82a and the plurality of screw holes 83a are provided at positions facing the plurality of recesses 85.

As shown in FIG. 2, holes 15h are formed at upper part of the auxiliary device case 15 (in the illustrated embodiment, an upper surface 72s in the vertical direction), at two corners opposite to the side of the auxiliary device case 15 to which the stack case 14 is connected. The holes 15h allow communication of the interior of the auxiliary device case 15 to the outside. Specifically, the holes 15h are formed at the two corners of the upper part of the second case member 90. The hole 15h may be provided only at one of the two corners of the upper part of the second case member 90. The hole 15h may be provided on an upper part of a side surface other than the upper surface 72s of the second case member 90 in the vertical direction.

As shown in FIG. 1, the fuel cell system 10 includes an exhaust apparatus 98 for discharging the fuel gas from the case unit 13 (the stack case 14 and the auxiliary device case 15). As shown in FIG. 2, ventilating air inlet holes 99 are provided in the stack case 14 for supplying the air from the outside into the stack case 14, and ventilating the inside of the stack case 14. The plurality of ventilating air inlet holes 99 are provided on the lower part of the stack case 14 (in the illustrated embodiment, on the lower part of the right side panel 78 and on the lower part of the rear side panel 80). Further, the plurality of ventilating air inlet holes 99 are formed on the lower part of the auxiliary device case 15 (in the illustrated embodiment, on the lower part of the first case member 88 and on the lower part of the second case member 90).

In FIG. 1, the exhaust apparatus 98 is connected to the upper part of the case unit 13, and in the case where the fuel gas is leaked out of the fuel cell stack 12 or the fuel cell auxiliary devices 70 (the fuel gas system device 70A and the oxygen-containing gas system device 70B), the fuel gas is discharged to the outside of the vehicle through the exhaust apparatus 98. The exhaust apparatus 98 includes ventilating ducts 100 connected to the case unit 13. The ventilation ducts 100 are connected to four corners of the case unit 13 in a plan view. Specifically, the exhaust apparatus 98 includes a ventilating duct 100 connected to the stack case 14 (hereinafter referred to as the "first ventilating duct 100a"), and a ventilating duct 100 connected to the auxiliary device case 15 (hereinafter referred to as the "second ventilating duct 100b").

The first ventilating duct 100a is connected to the hole 14h provided in the stack case 14. Therefore, the first ventilating duct 100a is connected to two corners of the upper part of the stack case 14, opposite to the side connected to the auxiliary device case 15. The first ventilating duct 100a includes two connection pipes 102a, 102b connected to the two holes 14h of the stack case 14, and a merge pipe 102c into which the two connection pipes 102a, 102b are merged together. The merge pipe 102c is connected to a right exhaust gas port 110R provided for a right fender 108R.

The second ventilating duct 100b is connected to the holes 15h provided in the auxiliary device case 15. In the structure, the second ventilating duct 100b is connected to two corners of the upper part of the auxiliary device case 15 opposite to the side connected to the stack case 14. The second ventilating duct 100b includes two connection pipes 104a, 104b connected to the two holes 15h of the auxiliary device case 15, and a merge pipe 104c into which the two connection pipes 104a, 104b are merged together. The merge pipe 104c is connected to a left exhaust gas port 110L provided for a left fender 108L.

The first ventilating duct 100a and the second ventilating duct 100b are connected together through a coupling pipe 112. The coupling pipe 112 is connected to the connection pipe 102a on the front side of the first ventilating duct 100a, and connected to the connection pipe 104a on the front side of the second ventilating duct 100b. In the structure, in a plan view, the first ventilating duct 100a and the second ventilating duct 100b are connected together on one side (front side) in a direction perpendicular to the direction (indicated by the arrow A) in which the stack case 14 and the auxiliary device case 15 are connected together. The coupling pipe 112 may be connected to the connection pipe 102b on the rear side of the first ventilating duct 100a and the connection pipe 104b on the rear side of the second ventilating duct 100b. The coupling pipe 112 may be connected to an intermediate pipe 102d between the connection pipe 102a and the connection pipe 102b of the first ventilating duct 100a and an intermediate pipe 104d between the connection pipe 104a and the connection pipe 104b of the second ventilating duct 100b.

As shown in FIG. 5, the fuel cell vehicle 11 includes the fuel cell system 10 having the fuel cell stack 12 for performing power generation using the fuel gas and the oxygen-containing gas, and an exhaust gas pipe 60 for discharging the cathode exhaust gas discharged from the fuel cell system 10 to the outside of the vehicle. Further, the fuel cell vehicle 11 includes electrical equipment such as an ECU (Electronic control unit) 62 which controls power generation of the fuel cell system 10 and traveling of the fuel cell vehicle 11, and a traction motor operated using electrical energy generated in power generation of the fuel cell system 10 as a power source.

Further, the fuel cell system 10 includes a fuel gas supply apparatus 25 for supplying a fuel gas (e.g., hydrogen gas) to the fuel cell stack 12, and an oxygen-containing gas supply apparatus 26 for supplying the air as the oxygen-containing gas to the fuel cell stack 12. Though not shown, the fuel cell system 10 further includes a battery as an energy storage device, and a coolant supply apparatus for supplying a coolant to the fuel cell stack 12.

Each of the power generation cells of the fuel cell stack 12 includes a membrane electrode assembly, and a pair of separators sandwiching the membrane electrode assembly. The membrane electrode assembly is formed by providing an anode, and a cathode on both surfaces of an electrolyte membrane (e.g., solid polymer electrolyte membrane).

The fuel gas supply apparatus 25 includes a fuel gas tank 28 for storing a high pressure fuel gas (high pressure hydrogen), a fuel gas supply line 30 for guiding the fuel gas to the fuel cell stack 12, the injector 32 provided for the fuel gas supply line 30, and the ejector 34 provided downstream of the injector 32. The fuel gas supply line 30 is connected to a fuel gas inlet 20a of the fuel cell stack 12. A fuel gas injection device is formed by the injector 32 and the ejector 34.

A fuel gas discharge line 36 is connected to a fuel gas outlet 20b of the fuel cell stack 12. After some of the fuel gas is consumed at the anode of the fuel cell stack 12, the fuel gas is discharged as an anode exhaust gas (fuel off gas) from the fuel cell stack 12 through the fuel gas discharge line 36. A circulation line 40 is coupled to the fuel gas discharge line 36. The circulating line 40 guides the anode exhaust gas to the ejector 34. The hydrogen pump 42 (circulation pump) is provided in the circulation line 40. It should be noted that the hydrogen pump 42 may not be provided.

A gas liquid separator 38 is provided in the fuel gas discharge line 36. A connection line 37 is connected to a liquid discharge port 38b of the gas liquid separator 38. A water discharge valve 39 is provided for the connection line 37. The water discharge valve 39 is opened/closed under control of the ECU 62.

The oxygen-containing gas supply apparatus 26 includes an oxygen-containing gas supply line 44 connected to an oxygen-containing gas inlet 20c of the fuel cell stack 12, an oxygen-containing gas discharge line 46 connected to an oxygen-containing gas outlet 20d of the fuel cell stack 12, the air pump 48 for supplying the air toward the fuel cell stack 12, and the humidifier 50 for humidifying the air to be supplied to the fuel cell stack 12.

The air pump 48 includes a compressor 48a for compressing the air, a motor 48b for rotating the compressor 48a, and an expander 48c (regenerative mechanism) coupled to the compressor 48a. The air pump 48 is controlled by the ECU 62. The compressor 48a is provided in the oxygen-containing gas supply line 44. In the oxygen-containing gas supply line 44, an air cleaner 52 is provided upstream of the compressor 48a. The air is supplied into the compressor 48a through the air cleaner 52.

The expander 48c is provided in the oxygen-containing gas discharge line 46. An impeller of the expander 48c is coupled to an impeller of the compressor 48a through a coupling shaft 48d. The impeller of the compressor 48a, the coupling shaft 48d, and the impeller of the expander 48c rotate together about a rotation axis a. The cathode exhaust gas is supplied into the impeller of the expander 48c to regenerate fluid energy from the cathode exhaust gas. The regenerative energy compensates for part of a driving force for rotating the compressor 48a.

The humidifier 50 has a large number of water permeable hollow fiber type membrane. In the hollow fiber type membrane, water component is exchanged between the air flowing toward the fuel cell stack 12 and the highly humidified cathode exhaust gas discharged from the fuel cell stack 12 to humidify the air flowing toward the fuel cell stack 12.

In the oxygen-containing gas supply line 44, a gas liquid separator 54 is provided between the humidifier 50 and the oxygen-containing gas inlet 20c of the fuel cell stack 12. The connection line 37 is connected to the gas liquid separator 54. One end of a drain pipe 55 is connected to a liquid exhaust port 54a of the gas liquid separator 54. The other end of the drain pipe 55 is connected to the exhaust gas pipe 60. An orifice 56 is provided in the drain pipe 55. The gas liquid separator 54 may not be provided. In the case where the gas liquid separator 54 is not provided, the connection line 37 may be connected directly to the oxygen-containing gas supply line 44.

The exhaust gas pipe 60 is connected to an outlet 48e of the expander 48c. The exhaust gas pipe 60 extends from the outlet 48e of the expander 48c, and extends along the vehicle body bottom part up to the vehicle body rear part.

Next, operation of the fuel cell system 10 having the structure as described above will be described.

During normal operation, the fuel cell system 10 is operated as follows. In FIG. 5, in the fuel gas supply apparatus 25, the fuel gas is supplied from the fuel gas tank 28 to the fuel gas supply line 30. At this time, the fuel gas is injected from the injector 32 toward the ejector 34. Then, the fuel gas flows from the fuel gas inlet 20a into the fuel gas flow field in the fuel cell stack 12 through the ejector 34, and then, the fuel gas is supplied to the anode.

In the meanwhile, in the oxygen-containing gas supply apparatus 26, under rotation operation of the air pump 48 (compressor 48a), the air as the oxygen-containing gas is supplied to the oxygen-containing gas supply line 44. After the air is humidified by the humidifier 50, the air flows from the oxygen-containing gas inlet 20c into the oxygen-containing gas flow field in the fuel cell stack 12, and the air is supplied to the cathode. In each of the power generation cells, the fuel gas supplied to the anode and the oxygen in the air supplied to the cathode are consumed in the electrochemical reactions in the electrode catalyst layer to perform power generation.

The fuel gas which has not been consumed at the anode is discharged as the anode exhaust gas, from the fuel gas outlet 20b into the fuel gas discharge line 36. The anode exhaust gas and the water discharged from the anode flow into the gas liquid separator 38. The anode exhaust gas is separated from the water in the gas liquid separator 38, and the anode exhaust gas flows into the circulation line 40 through the gas exhaust port 38a of the gas liquid separator 38. The liquid quantity in the gas liquid separator 38 is adjusted by opening/closing of the water discharge valve 39 based on a command from the ECU 62. It should be noted that the water discharge valve 39 is opened during stop of operation of the fuel cell stack 12, and liquid water in the gas liquid separator 38 is discharged to the gas liquid separator 54 provided in the oxygen-containing gas supply line 44 through the connection line 37. Liquid water is discharged from the gas liquid separator 54 to the outside of the vehicle through the drain pipe 55 and the exhaust gas pipe 60.

The anode exhaust gas flows from the fuel gas discharge line 36 into the ejector 34 through the circulation line 40. The anode exhaust gas flowed into the ejector 34 is mixed with the fuel gas injected by the injector 32, and supplied to the fuel cell stack 12.

The highly humidified cathode exhaust gas containing the oxygen which has not been consumed at the cathode and the water produced in the reaction at the cathode are discharged from the oxygen-containing gas outlet 20d of the fuel cell stack 12 to the oxygen-containing gas discharge line 46. In the humidifier 50, water component is exchanged between the cathode exhaust gas and the air flowing toward the fuel cell stack 12, and thereafter, the cathode exhaust gas flows into the expander 48c of the air pump 48. In the expander 48c, energy is collected (regenerated) from the cathode exhaust gas, and then, regenerative energy is used as part of the driving force of the compressor 48a. The cathode exhaust gas and water are discharged from the expander 48c to the exhaust gas pipe 60, and discharged to the outside of the vehicle through the exhaust gas pipe 60.

At the time of starting operation of the fuel cell system 10, if it is determined that warming up of the fuel cell stack 12 is necessary based on the temperature of the ECU 62, warming up operation is performed before normal operation. During warming up operation, the water discharge valve 39 provided in the connection line 37 connected to the gas liquid separator 38 is opened by a command from the ECU 62. Then, as in the case of normal operation, the fuel gas is supplied to the anode of the fuel cell stack 12 by the fuel gas supply apparatus 25, and the oxygen-containing gas is supplied to the cathode of the fuel cell stack 12 by the oxygen-containing gas supply apparatus 26 to perform power generation.

Since the water discharge valve 39 is opened, the fuel gas is supplied into the oxygen-containing gas supply line 44 through the connection line 37. Therefore, the oxygen-containing gas and the fuel gas are supplied to the cathode of the fuel cell stack 12. As a result, exothermic reaction (catalyst combustion) occurs at cathode catalyst. By the heat produced in the exothermic reaction and the heat produced in the above power generation reaction, the fuel cell stack 12 is heated rapidly. Then, if it is determined that the temperature of the fuel cell stack 12 reaches the warming up completion temperature, the water discharge valve 39 is closed for switching to the normal operation described above.

In this case, the fuel cell system 10 offers the following advantages.

As shown in FIG. 3, the fuel cell system 10 realizes integration of structure by providing the auxiliary device case 15 with the end plate part 88a which applies the tightening load in the stacking direction to the fuel cell stack 12, as an integral part of the auxiliary device case 15. That is, in the fuel cell system 10, the auxiliary device case 15 and the end plate are not provided as separate components. Part of the auxiliary device case 15 also serves as the end plate (the end plate is integrated into the auxiliary device case 15). Therefore, by integration of the structure, it becomes easy to achieve reduction of the seal interface and the flange, and reduction of the cost, weight and size. Further, structure of the auxiliary device case 15 is comparatively simple, and the seal interface is small. Therefore, it is possible to assemble the auxiliary device case 15 to the stack case 14 comparatively easily (easy assembling).

In particular, in the embodiment of the present invention, the auxiliary device case 15 includes the first case member 88 provided adjacent to the stack case 14, and the second case member 90 joined to the first case member 88. The first case member 88 is provided between the stack case 14 and the second case member 90. The first case member 88 includes the end plate part 88a joined to the stack case 14, and the peripheral wall 88b extending from the entire periphery of the marginal portion 88*ae* of the end plate part 88*a* toward the second case member in the thickness direction of the end plate part 88*a*. Further, the fuel cell auxiliary device 70 is at least partly stored in the first case member 88. In the structure, it is possible to suitably protect the fuel cell auxiliary device 70 against the external load.

The marginal portion of the end plate part 88*a* is joined to the end of the stack case 14 by the tightening members (bolts 82*a*) provided inside the peripheral wall 88*b* of the first case member 88. In the structure, it is possible to provide large internal space of the auxiliary device case 15. That is, it is possible to allow a desired space for arranging the fuel cell auxiliary devices 70.

The seal member 79 is provided throughout the entire periphery, outside of the tightening members (bolts 82*a*) between the stack case 14 and the first case member 88. In the structure, even if leakage of the fuel gas occurs inside the auxiliary device case 15, it is possible to reliably prevent leakage of the fuel gas from the inside of the auxiliary device case 15 to the outside through the bolt insertion holes 88*h*.

The marginal portion of the end plate part 88*a* is joined to the end of the stack case 14 by the plurality of first tightening members (bolts 82*a*) provided inwardly of the peripheral wall 88*b* of the first case member 88. The second case member 90 is joined to the peripheral wall 88*b* of the first case member 88 by the plurality of second tightening members (bolts 82*b*). Further, as shown in FIG. 4, the plurality of first tightening members (bolts 82*a*) and the plurality of second tightening members (bolts 82*b*) are arranged in a zigzag pattern along the outer peripheral portion of the first case member 88. In the structure, at the time of fixing the case body 76 and the first case member 88 using the first tightening members (bolts 82*a*), since the tightening tools do not interfere with the first case member 88 easily, it is possible to achieve easy assembling. Further, by improvement of the space efficiency thanks to the layout in the zigzag pattern, it is possible to achieve reduction of the size of the auxiliary device case 15 including the first case member 88 (and thus, the fuel cell system 10).

The recess 85 recessed toward the outer peripheral surface of the first case member 88 is provided between the adjacent screw holes 83*b*, in the inner surfaces of the peripheral wall 88*b* and the first flange 88*c* of the first case member 88. In the structure, at the recess 85, it is possible to reduce the thickness of the peripheral wall 88*b* and the first flange 88*c*, and achieve weight reduction of the first case member 88. Further, since the inner peripheral portion of the first case member 88 is cut away at the position of the recess 85, it is possible to prevent interference of the tool (tightening tool) used at the time of tightening the first tightening members (bolts 82*a*) with the inner peripheral portion of the first case member 88, and it is easy to rotate the tightening tool. Further, by providing the recess 85, it is possible to reduce the distance L between the centers of the screw hole 83*a* and the screw hole 83*b*, and achieve size reduction of the auxiliary device case 15 having the first case member 88.

In particular, the fuel cell auxiliary device 70 has the fuel gas system device 70A, and the fuel gas system device 70A is stored in the first case member 88. In the structure, it is possible to suitably protect the fuel gas system device 70A against the external load.

The second case member 90 has a recessed shape recessed in a direction away from the fuel cell stack 12. The fuel cell auxiliary devices 70 include the oxygen-containing gas system device 70B. The oxygen-containing gas system device 70B is stored in the second case member 90. In the structure, even if leakage of the fuel gas from the oxygen-containing gas system device 70B occurs, it is possible to suitably discharge the fuel gas to a predetermined area (outside the vehicle) by a ventilating function of the auxiliary device case 15.

In the embodiment of the present invention, in FIG. 1, the fuel cell system 10 is mounted in the fuel cell vehicle 11 in a manner that the stacking direction of the fuel cell stack 12 is oriented in the vehicle width direction (indicated by the arrow B). Alternatively, the fuel cell system 10 may be mounted in the fuel cell vehicle 11 in a manner that the stacking direction of the fuel cell stack 12 may be oriented in the vehicle front/rear direction (indicated by the arrow A). In the embodiment of the present invention, the fuel cell system 10 is mounted in the fuel cell vehicle 11 in a manner that the stack case 14 is provided on the right side, and the auxiliary device case 15 is provided on the left side. Alternatively, the fuel cell system 10 may be mounted in the fuel cell vehicle 11 in a manner that the stack case 14 is provided on the left side and the auxiliary device case 15 is provided on the right side.

The present invention is applicable to the fuel cell system which does not have the stack case 14. In this case, though not shown, for example, the first case member 88 of the auxiliary device case 15 provided at one end of the fuel cell stack 12 in the stacking direction and the end plate member provided at the other end of the fuel cell stack 12 in the stacking direction are coupled together using a plurality of coupling members in the form of bars or rods, to apply the tightening load in the stacking direction to the fuel cell stack 12.

The present invention is not limited the above embodiments. Various modifications can be made without departing from the gist of the present invention.

What is claimed is:
1. A fuel cell system comprising:
a fuel cell stack;
a stack case storing the fuel cell stack; and
an auxiliary device case joined to the stack case, and storing a fuel cell auxiliary device, wherein
the auxiliary device case includes an end plate part configured to apply a tightening load in a stacking direction to the fuel cell stack, as an integral part of the auxiliary device case,
the auxiliary device case includes a first case member provided adjacent to the stack case and a second case member joined to the first case member,
the first case member is provided between the stack case and the second case member,
the first case member includes the end plate part joined to the stack case, and a peripheral wall extending form the entire periphery of a marginal portion of the end plate part toward the second case member in a thickness direction of the end plate part,
the marginal portion of the end plate part is joined to an end of the stack case by a plurality of first tightening members provided inward of the peripheral wall,
a seal member is provided throughout the entire periphery, outward of the tightening member between the stack case and the first case member,
the end plate part comprises a plurality of insertion holes into which the plurality of first tightening members are inserted, and
the seal member is interposed between the stack case and the first case member in a manner that the seal member surrounds the plurality of insertion holes.

2. The fuel cell system according to claim 1, wherein the fuel cell auxiliary device is at least partly stored in the first case member.

3. The fuel cell system according to claim 1, wherein
the second case member is joined to the peripheral wall of the first case member by a plurality of second tightening members, and
the plurality of first tightening members and the plurality of second tightening members are arranged in a zigzag pattern along an outer peripheral portion of the first case member.

4. The fuel cell system according to claim 2, wherein
the fuel cell auxiliary device includes a fuel gas system device, and
the fuel gas system device is stored in the first case member.

5. The fuel cell system according to claim 4, wherein
the second case member has a recessed shape recessed in a direction away from the fuel cell stack,
the fuel cell auxiliary device includes an oxygen-containing gas system device, and
the oxygen-containing gas system device is stored in the second case member.

6. The fuel cell according to claim 5, wherein the auxiliary device case has an air inlet hole for ventilation.

7. The fuel cell system according to claim 1, wherein
the auxiliary device case is provided adjacent to the stack case in a horizontal direction, and
the outer shape of the auxiliary device case in the vertical direction is larger than the outer shape of the stack case in the vertical direction.

8. The fuel cell system according to claim 2, wherein the outer size of the second case member in the stacking direction is larger than the outer size of the first case member in the stacking direction.

9. The fuel cell system according to claim 4, wherein the fuel gas system device includes an injector configured to inject a fuel gas.

10. The fuel cell system according to claim 5, wherein the oxygen-containing gas system device includes a humidifier configured to humidify an oxygen-containing gas to be supplied to the fuel cell stack.

11. A fuel cell system comprising:
a fuel cell stack;
a stack case storing the fuel cell stack; and
an auxiliary device case provided adjacent to the fuel cell stack, and storing a fuel cell auxiliary device, wherein
the auxiliary device case includes an end plate part configured to apply a tightening load in a stacking direction to the fuel cell stack, as an integral part of the auxiliary device case,
the auxiliary device case includes a first case member provided adjacent to the stack case and a second case member joined to the first case member,
the first case member is provided between the stack case and the second case member,
the first case member includes the end plate part joined to the stack case, and a peripheral wall extending from the entire periphery of a marginal portion of the end plate part toward the second case member in a thickness direction of the end plate part,
the marginal portion of the end plate part is joined to an end of the stack case by a plurality of first tightening members provided inward of the peripheral wall of the first case member,
the second case member is joined to the peripheral wall of the first case member by a plurality of second tightening members,
the plurality of second tightening members are arranged in a manner that the plurality of second tightening members surround the plurality of first tightening member, when viewed from the stacking direction, and
an inner surface of the peripheral wall includes recesses recessed at portions corresponding to the plurality of the first tightening members.

12. A fuel cell system comprising:
a fuel cell stack;
a stack case storing the fuel cell stack; and
an auxiliary device case joined to the stack case, and storing a fuel cell auxiliary device, wherein
the auxiliary device case includes an end plate part configured to apply a tightening load in a stacking direction to the fuel cell stack, as an integral part of the auxiliary device case,
the auxiliary device case includes a first case member provided adjacent to the stack case and a second case member joined to the first case member;
the first case member is provided between the stack case and the second case member,
the first case member includes an end plate part joined to the stack case, and a peripheral wall extending from the entire periphery of a marginal portion of the end plate part toward the second case member in a thickness direction of the end plate part; and
the marginal portion of the end plate part is joined to an end of the stack case by a plurality of first tightening members provided inward of the peripheral wall,
the second case member is joined to the peripheral wall of the first case member by a plurality of second tightening members, and
the plurality of first tightening members and the plurality of second tightening members are arranged in a zigzag pattern along an outer peripheral portion of the first case member.

* * * * *